June 4, 1968     Q. A. HANSEN     3,386,547
ALTERNATELY OPERATED FORWARD AND REVERSE CAM CLUTCHES
Filed May 17, 1966     2 Sheets-Sheet 1
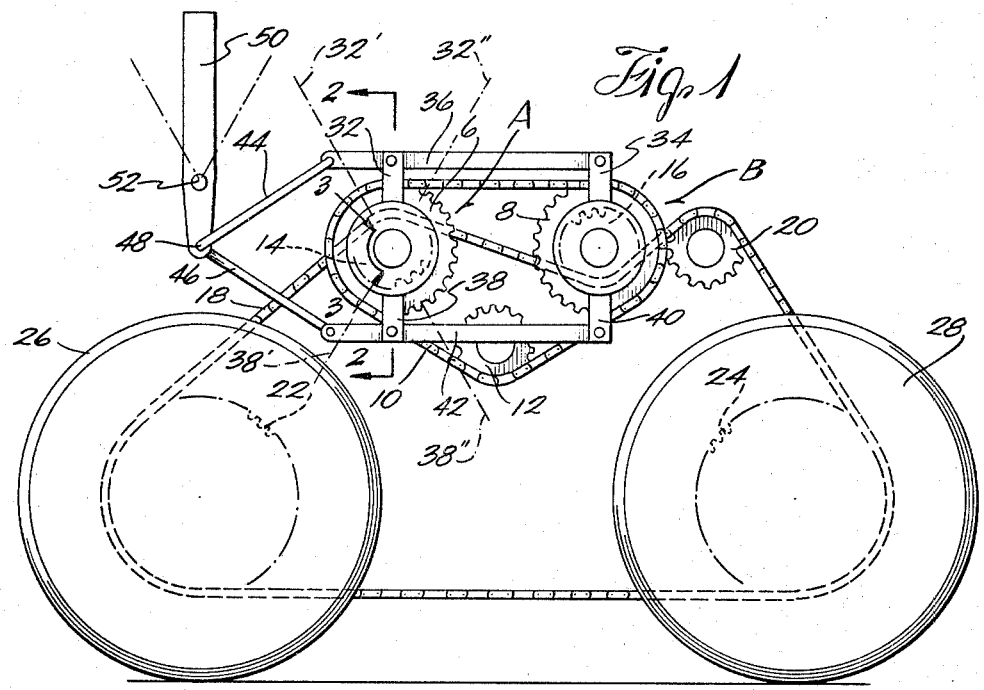
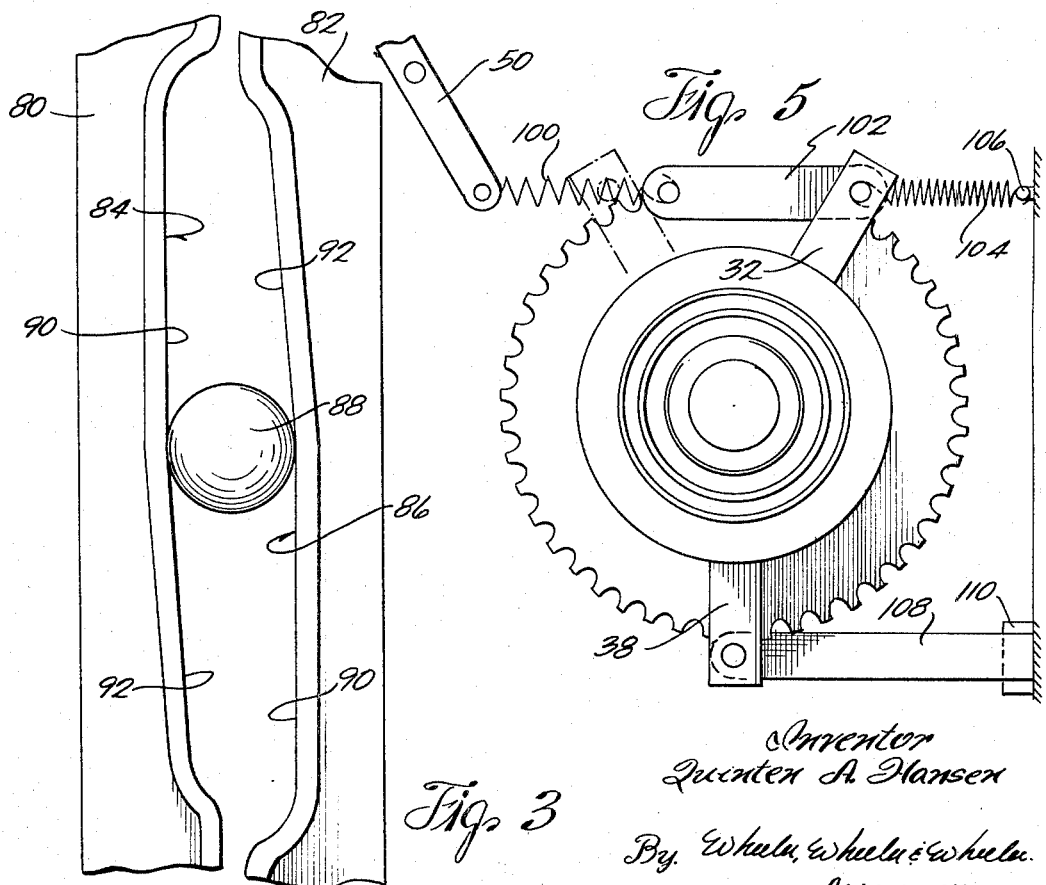
Inventor
Quinten A. Hansen
By Whelan, Whelan & Whelan
Attorneys

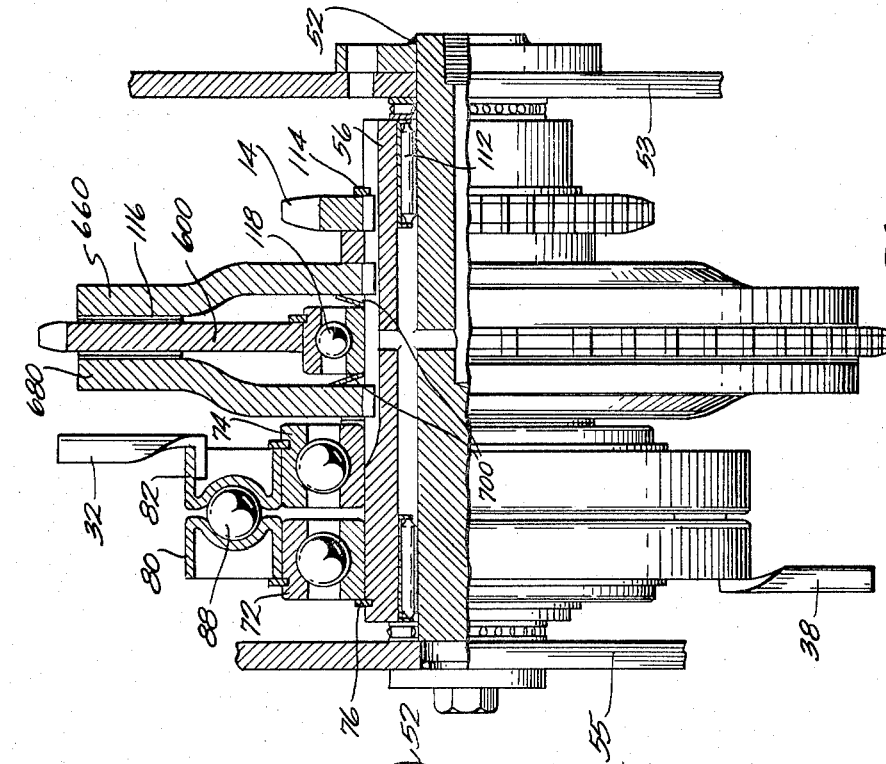
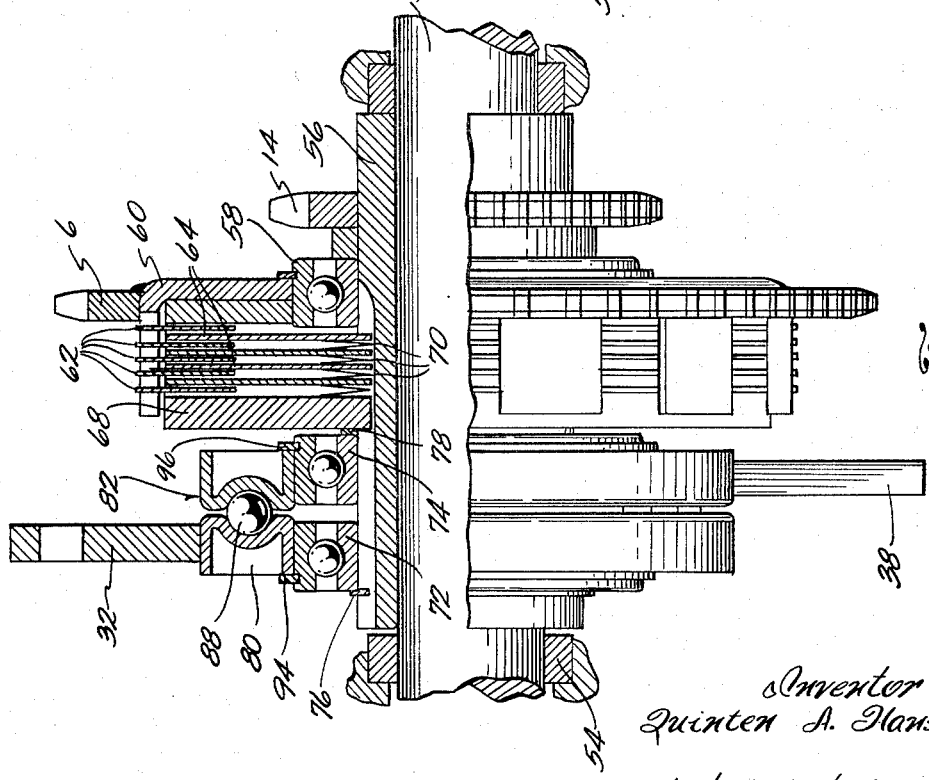

United States Patent Office 3,386,547
Patented June 4, 1968

3,386,547
ALTERNATELY OPERATED FORWARD AND
REVERSE CAM CLUTCHES
Quinten A. Hansen, 4338 Highway 38,
Franksville, Wis. 53126
Filed May 17, 1966, Ser. No. 550,757
4 Claims. (Cl. 192—51)

ABSTRACT OF THE DISCLOSURE

For concurrent actuation of a plurality of clutches in alternation with each other, oppositely acting ball cams are controlled by a single lever and so designed that each cam actuates its respective clutch to a neutral position midway of the range of cam movement, and retains the actuated clutch in neutral pending the reverse movement effected by the other clutch controlled by the lever.

In the preferred organization, whether applied to a single clutch or multiple clutches, the driving friction developed in the clutch is made to depend directly upon the pressure exerted by the operator on the controlling lever. Particularly when the clutch is used to control a motor vehicle, this gives a desirable "feel," meaning that the operator is able to determine tangibly by the tension he exerts on the clutch control lever the approximate effect produced by the clutch. This is particularly effective in a combination in which the clutch is actuated by a rolling ball type of cam.

Background of the invention

The clutch assembly of the present invention is a development of the clutch of my former Patent 3,127,969.

Description of the invention

In the drawings:

FIG. 1 is a diagrammatic view showing a pair of clutches having their output sprockets engaged to actuate a driven chain in either of two directions to produce forward or reverse movement in the wheels which receive motion from the chain.

FIG. 2 is an enlarged fragmentary detail view taken in cross section through one of the two clutches on the line 2—2 of FIG. 1 (the other clutch normally being identical).

FIG. 3 is a diagrammatic developed view of a preferred form of cam.

FIG. 4 is a view similar to FIG. 2 showing a somewhat modified clutch.

FIG. 5 is a fragmentary detail view comparable to a portion of FIG. 1 but showing a modified arrangement for communicating motion from the operating lever to the linkage which operates a single clutch.

In the diagrammatic showing of FIG. 1, I have illustrated two clutches A and B which may be identical with driving sprockets 6 and 8 as hereinafter disclosed which are actuated by a single chain 10 from a power input sprocket 12, the clutches respectively having output sprockets 14 and 16 engaged with a driven chain 18 passing about the respective sprockets in opposite directions and trained over an idler sprocket 20 to actuate the driven sprockets 22, 24, the wheels 26 and 28 of which may be the wheels of a vehicle or a vehicle bogie. The desired arrangement in this organization is such that when the clutch A is engaged, the clutch B will be disengaged and vice versa.

As will be shown hereinafter, each of the clutches is desirably engaged and disengaged by relative manipulation of the two parts of a ball cam. One of these parts may be fixed and the other movable. Alternatively, the two parts may be movable in opposite directions. For the purposes of the disclosure of FIG. 1, the latter is assumed to be the case. The relatively movable parts are not shown in this view but the projecting tabs 32 and 34 of corresponding elements of the two clutches have a common operating bar 36 to which they are pivoted. The tabs 38 and 40 are pivoted to a separate operating bar 42. The links 44 and 46 connect the respective bars through pivot 48 with the manually operated lever 50 which is pivoted at 52.

FIG. 2 is a typical cross section through either clutch, showing the positions of the parts when the tabs are in the positions in which the clutches are disengaged. A supporting shaft 52 has any appropriate mountings at 54. Rotatable upon it is a hub 56 which carries the output sprocket 14 (in the case of clutch A). Rotatably mounted on this hub by means of the bearing 58 is the drive cup 60 to which is fixed the power-input sprocket 6. The friction clutch disks 62 are splined or otherwise connected with the drive cup 60 and interleaved with friction driven disks 64 splined or otherwise connected with the hub 56. The assembly of disks is compressed between a fixed pressure plate 66 and a movable pressure plate 68, the latter being preferably splined to the hub 56 like disks 64. Intervening between the various clutch disks or plates are the release springs 70 which are preferably Belleville springs set back to back with their internal peripheries engaging the hub and their outer peripheries engaging the separable plates.

Encircling hub 56 are the inner races of two thrust bearings 72 and 74. Bearing 72 abuts a stop fixed to the hub as here represented by snap ring 76 for which the hub is provided with an appropriate groove. Bearing 74 is bodily slideable axially of the hub to transmit motion through a washer or spacer 78 to the pressure plate 68.

Peripherally mounted on the outer races of the respective thrust bearings 72 and 74 are the complementary rings 80 and 82, these having at a plurality of angularly spaced points complementary channels 84 and 86 for the camming means, here shown as balls 88 confined between the rings. In accordance with the instant invention, each of the channels 84 and 86 has a non-camming first portion 90 of substantial arcuate extent which is desirably normal to the axis of the hub, and a camming second portion 92 which extends obliquely toward the opposing channel as clearly shown in FIG. 3. The portions 90 of the respective channels are parallel. Therefore, when a ball is in the portion 90 of each channel, the clutch is disengaged.

No ball-positioning cages have been found necessary. In a considerable period of testing these devices, the balls have never, to my knowledge, been found out of phase. If they did get out of phase, they would resume proper relative positions at the extremities of the relative shifting movements.

When the rings 80 and 82 are oscillated in respect to each other from the mid-position of FIG. 3 (either by manipulation of one or both rings) the ball 88 will either ride in parallel portions 90 of the respective grooves for a part of the range of movement (in one direction) or will roll between oblique portions 92 if relative movement is in the opposite direction, thereby camming ring 82 away from ring 80. If relative rotation starts at the limit of oscillation in one direction (ring 80 down, ring 82 up in FIG. 3) the first relative reverse rotation from that position will effect no camming action. Camming will ensue when oblique channel areas engage ball 88.

Ring 80 cannot move in response to camming action because of the snap washer 94 on thrust bearing 72 which thrust bearing is also fixed against axial displacement to the left as viewed in FIG. 2. However, snap washer 96 on ring 82 causes the axial movement of ring 82 to be transmitted to bearing 74 and thence to the pressure plate 68 to overcome the resistance of the spacing springs 70 and to effect engagement of the several clutch disks for the transmission of motion between the driving sprocket 6 and the hub 56 upon which driven sprocket 14 is mounted.

A similar but opposite arrangement of the rings of clutch B will assure that when clutch A is engaged clutch B will remain in its neutral position, the camming balls rolling idly between the parallel portions 90 of the respective channels of clutch B during this operation. However, if the control lever is actuated in the opposite direction of oscillation, the camming balls 88 of clutch A will roll idly between parallel portions 90 of their respective channels while the camming balls 88 of clutch B will operate to engage clutch B, thereby activating the chain 18 in a direction opposite to that in which it was driven by clutch A.

In FIG. 1, the parts are shown in neutral position with the tabs 32 and 38 of their respective rings in diametrically opposite locations. The dotted lines positions 32' and 38' represent the situation in which clutch A is engaged and clutch B remains disengaged. The dotted line position 32" and the dotted line position 38" are the positions of the tabs 32 and 38 in which clutch A is disengaged and clutch B is engaged.

By operating the ball cam rings 80 and 82 simultaneously in opposite directions, the range required for operation of the respective clutches is half as great as is required if one of the rings is fixed and only one is moved. However, greater power must be exerted on the operating lever 50 because it must achieve its effect in half the range of movement.

One of the advantages of the construction disclosed consists in the fact that the resistance tangibly felt by the operator in handle 50 is proportioned to the pressure exerted on the clutch plates and hence is proportioned to the driving force of, or torque developed in, the clutch. This is true even though a spring 100 is interposed between lever 50 and the operating bar 102 of the clutch shown in FIG. 5. The spring 104 has a fixed anchorage at 106 and serves merely to release the clutch. It can be relatively light because the clutch preferably includes the releasing springs 70 between the plates.

In the construction shown in FIG. 5, I have also illustrated an arrangement whereby the tab 32 actuated by bar 102 is connected to the only ball clutch ring which is movable, the tab 38 having a link 108 fixedly connecting it to the anchorage 110 so that it cannot move. The angle of relative movement of tab 32 in such a device is twice as great as that required of either tab in the construction of FIG. 1, where both of the ball cam rings are rotatable in opposite directions. In practice, the range may be approximately 30° when both rings rotate, but 60° when only one ring rotates. Particulars given are by way of example and not by way of limitation.

FIG. 4 shows a somewhat different arrangement in which the stationary shaft 52 has fixed supports in the frame members 55. The hub 56 is essentially like that above described but may have bearings 112 supporting it from shaft 52. The output sprocket 14 is splined to the hub and secured against movement by a snap ring 114.

The clutch comprises merely a pair of plates 680 and 660 having friction surfaces at 116 and splined to the hub 56 for movement to and from engagement with the opposing faces of the driving sprocket 600. The latter is supported by a bearing 118 from hub 56 and is normally centered between the plate 660 and 680 by the Belleville springs 700.

The actuating ball clutch is essentially like that described, comprising a pair of thrust bearings 72 and 74. The bearing 72 seats against a snap ring 76 on the hub, as in the construction previously described. Bearing 74 is in thrust engagement with plate 680. The ball cam rings 80 and 82 are mounted on the respective bearings and are cammed apart by an intervening ball 88 as already described. The respective rings have opposing tabs 32 and 38 for their relative oscillation. When the ball 88 cams the rings 80 and 82 apart, the clutch is engaged to transmit motion from sprocket 600 to sprocket 14. As shown, the rings are in their neutral position and the plates 660 and 680 are out of friction bearing contact with sprocket 600, whereupon the sprocket 14 is not driven.

It is to be understood that the various features herein illustrated may be used alternatively in the various combinations shown.

I claim:

1. The combination of a driven part and two clutches therefor each having operative motion transmitting connection with said part, each of said clutches comprising rotatably mounted friction disks, one of which has a mounting upon which it is axially movable to and from engagement with the other, and means for actuating the said one disk of each clutch and comprising ball cam rings mounted for relative rotative and axial movement and having means for transmitting respective axial movement to engage the disks of the respective clutch, the rings having opposing complementary channels with converging portions, balls in the respective channels for camming said rings apart axially to engage the respective clutch disks, other portions of the channels being substantially parallel, and the said rings and balls being so oriented as between the respective clutches that one of the clutches will remain disengaged while the other is engaged.

2. A combination according to claim 1 in which the respective rings have radially projecting tabs, and a hand lever has linkage connecting it with at least one tab of a ring of each clutch for effecting relative rotative movement between the rings of the respective pairs in each clutch.

3. A combination according to claim 2 in which a spring provides a yieldable connection between the lever and the tab actuated thereby.

4. A cam operated clutch comprising driving and driven members relatively movable axially to and from driving contact, a camming device comprising rings, said rings being relatively rotatable and operatively connected with respective members for effecting relative axial movement thereof, means interposed between said rings for camming them apart axially upon the occurrence of relative rotative movement between the rings whereby to develop axial thrust upon said members, and a manual operating lever connected with at least one of said rings for effecting such relative rotative movement between said rings, the perceptible resistance offered by said lever being generally proportional to the pressure of axial engagement of said members and thus to the torque developed in the clutch, said rings having opposing channels with complementary converging portions, and the means for developing axial thrust between said rings comprising a cam ball seated in said channels, said channels having substantially parallel portions in which said ball may roll without camming said rings apart axially, in further combination with a second like clutch, the channels of the rings of the respective clutches being so organized that the ball between the rings of the first said clutch will roll in parallel channel portions thereof while the ball between the rings of the second clutch will roll between converging channel portions of the rings of said second clutch, whereby the first said clutch has said members operatively engaged while the members of the second said clutch will be disengaged.

References Cited

UNITED STATES PATENTS

| | | |
|---|---|---|
| 1,157,001 | 10/1915 | Howard. |
| 1,625,769 | 4/1927 | Ersted. |
| 1,999,284 | 4/1935 | Colvin. |
| 2,336,642 | 12/1943 | Schreck. |
| 2,661,826 | 12/1953 | Hendrickson et al. |
| 2,827,994 | 3/1958 | Tiedeman. |

BENJAMIN W. WYCHE III, *Primary Examiner.*